US011162647B2

(12) United States Patent
Christensen

(10) Patent No.: US 11,162,647 B2
(45) Date of Patent: Nov. 2, 2021

(54) FLASHLIGHT WITH OVERMOLDED GRIP AND METHODS OF MANUFACTURE

(71) Applicant: Simple Products Corporation, Draper, UT (US)

(72) Inventor: Brian Christensen, Draper, UT (US)

(73) Assignee: Simple Products Corporation, Draper, UT (US)

(*) Notice: Subject to any disclaimer, the term of this patent is extended or adjusted under 35 U.S.C. 154(b) by 60 days.

(21) Appl. No.: 16/230,373

(22) Filed: Dec. 21, 2018

(65) Prior Publication Data

US 2020/0018449 A1   Jan. 16, 2020

Related U.S. Application Data

(60) Provisional application No. 62/696,227, filed on Jul. 10, 2018.

(51) Int. Cl.
| | |
|---|---|
| *F21L 4/00* | (2006.01) |
| *B29C 45/14* | (2006.01) |
| *B29C 45/26* | (2006.01) |
| *B29L 31/00* | (2006.01) |
| *B29K 23/00* | (2006.01) |

(52) U.S. Cl.
CPC ........ *F21L 4/005* (2013.01); *B29C 45/14065* (2013.01); *B29C 45/14622* (2013.01); *B29C 45/14836* (2013.01); *B29C 45/261* (2013.01); *B29K 2023/06* (2013.01); *B29K 2023/12* (2013.01); *B29L 2031/747* (2013.01)

(58) Field of Classification Search
CPC ............... F21L 4/005; B29C 45/14065; B29C 45/14622; B29C 45/14836; B29C 45/261; B29C 45/14598; B29K 2023/06; B29K 2023/12; B29L 2031/747; F21V 21/406; F21Y 2115/10

See application file for complete search history.

(56) References Cited

U.S. PATENT DOCUMENTS

| | | | |
|---|---|---|---|
| 5,460,762 A | 10/1995 | Andre | |
| 5,601,359 A | 2/1997 | Sharrah et al. | |
| 5,678,921 A * | 10/1997 | Kish | ........................ F21L 4/005 362/188 |
| 5,688,045 A | 11/1997 | Butte | |
| 5,957,567 A * | 9/1999 | Kish | .................... F21V 23/0414 362/202 |
| 6,024,054 A | 2/2000 | Matt et al. | |

(Continued)

FOREIGN PATENT DOCUMENTS

JP   H0699366 A   4/1994

*Primary Examiner* — Bao Q Truong
(74) *Attorney, Agent, or Firm* — Thorpe North & Western

(57) ABSTRACT

A flashlight can include a flashlight shaft, a grip overmolded on the flashlight shaft, and a light element connected to the flashlight shaft. The flashlight shaft can have a circumferential grip recess bounded by two raised portions. The grip recess can have a surface lower than the two raised portions around a circumference of the shaft. The shaft can be integrally formed as a single piece. The grip can be overmolded into the grip recess, such that the grip covers the surface of the grip recess and is bounded by the two raised portions. The grip can be formed of a material that is insufficiently flexible to pass over the two raised portions without damage.

21 Claims, 9 Drawing Sheets

(56) References Cited

U.S. PATENT DOCUMENTS

| | | | |
|---|---|---|---|
| 6,283,611 B1* | 9/2001 | Sharrah | F21L 4/005 |
| | | | 362/158 |
| 6,419,371 B1 | 7/2002 | McCalla et al. | |
| 7,972,129 B2 | 7/2011 | O'Donoghue | |
| 8,348,454 B2 | 1/2013 | Henry et al. | |
| 8,591,387 B2 | 11/2013 | Fife | |
| 9,194,547 B2 | 11/2015 | Ancona et al. | |
| 9,555,538 B2 | 1/2017 | Blakeman | |
| 9,845,938 B1* | 12/2017 | Kaye | F21V 15/04 |
| 2001/0030864 A1* | 10/2001 | Winkler | F21L 4/005 |
| | | | 362/208 |
| 2009/0279290 A1* | 11/2009 | Henry | F21V 21/406 |
| | | | 362/191 |
| 2010/0085739 A1 | 4/2010 | Webb et al. | |
| 2011/0164411 A1* | 7/2011 | Sparing | F21L 4/027 |
| | | | 362/197 |
| 2011/0214619 A1 | 9/2011 | Risch et al. | |
| 2012/0300438 A1 | 11/2012 | Tarter et al. | |
| 2013/0279158 A1* | 10/2013 | Weinrich | F21L 4/005 |
| | | | 362/190 |
| 2014/0204569 A1 | 7/2014 | Banagas | |
| 2016/0207190 A1 | 7/2016 | Balz et al. | |
| 2017/0299166 A1* | 10/2017 | Pazdur | H05B 47/11 |

\* cited by examiner

FLASHLIGHT WITH OVERMOLDED GRIP AND METHODS OF MANUFACTURE

RELATED APPLICATION

This application claims the benefit of U.S. Provisional Application No. 62/696,227, filed Jul. 10, 2018 which is incorporated herein by reference.

BACKGROUND

Handheld flashlights can generally include a light source such as a bulb or light emitting diode, one or more batteries, and a flashlight body for housing the batteries and light source. Flashlight bodies can be manufactured from a variety of materials. Plastics are often used due to their low cost and ease of use. In more premium flashlights, metals such as aluminum can be used to form the flashlight body. From an ergonomics standpoint, the ease with which a user can grip a flashlight may be of concern. For example, flashlights having a smooth aluminum body may be slippery and hard to hold, while rigid metal outer surfaces can also be less comfortable to handle. For this reason, various grips have been added to flashlights. In some cases, flashlight grips have been formed by knurling the flashlight body to provide a higher friction surface. In other examples, flexible grips have been added such as rubber sleeves that can be stretched over the flashlight body. Despite these options, improvements continue to be sought which provide a combination of aesthetic and functional benefits.

SUMMARY

The present disclosure describes flashlights with overmolded grips. The present disclosure also extends to systems and methods for overmolding flashlight grips. In one example, a flashlight can include a metal flashlight shaft having a circumferential grip recess bounded by two raised portions. The grip recess can have a surface that is lower than the two raised portions around a circumference of the shaft. The shaft can be integrally formed as a single piece. A grip can be overmolded directly into the grip recess. The grip can cover the surface of the grip recess and be bounded by the two raised portions. The grip can be formed of a material that is insufficiently flexible to pass over the two raised portions without damage. A light element can also be connected to the flashlight shaft.

A method of overmolding a flashlight grip can include providing a metal flashlight shaft having a circumferential grip recess bounded by two raised portions. The grip recess can have a surface that is lower than the two raised portions around the circumference of the shaft. The shaft can be integrally formed as a single piece. The metal flashlight shaft can be positioned in a mold to isolate a grip volume bounded by the surface of the grip recess, the raised portions, and an interior grip surface of the mold. A polymer material can then be injected into the isolated volume to form an overmolded grip covering the surface of the grip recess and bounded by the two raised portions. The polymer material can be a material insufficiently flexible to pass over the two raised portions without damage.

An overmolding system can include a mold adapted to be engaged with a metal flashlight shaft. The mold can isolate a grip volume. The metal flashlight shaft can include a hollow interior and can have a circumferential grip recess bounded by two raised portions. The grip recess can have a surface lower than the raised portions around the circumference of the shaft. The grip volume can be bounded by the surface of the grip recess, the raised areas, and an interior grip surface of the mold. The system can also include a support bar sized to slide in the hollow interior to provide structural support to the metal flashlight shaft during molding. A polymer material injection port can be connected to the mold. The polymer material injection port can be operably connectable to a polymer material injector to inject a polymer material into the isolated volume.

There has thus been outlined, rather broadly, several features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
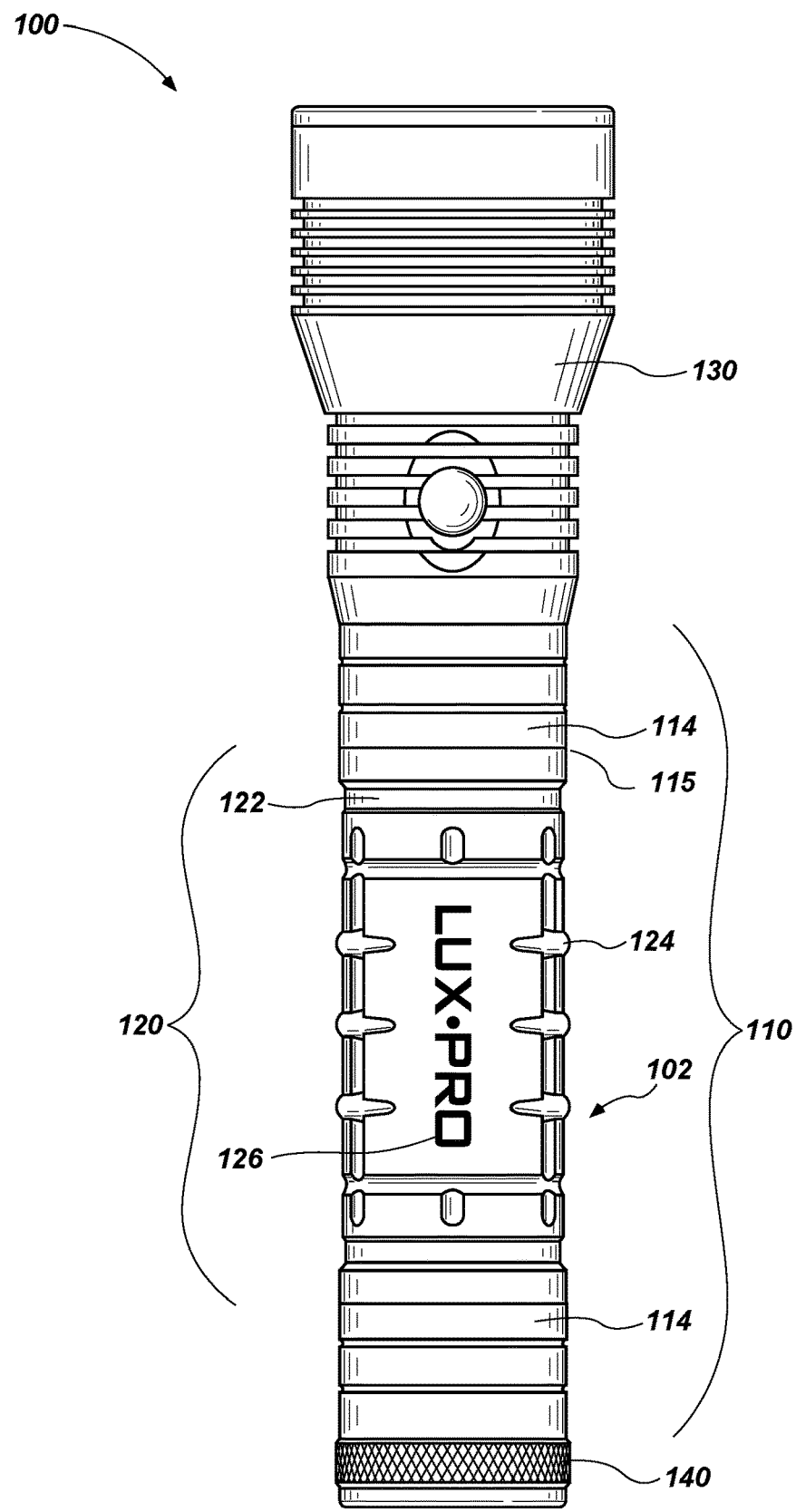
FIG. 1 is a top view of a flashlight in accordance with an example of the present technology.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

It is noted that, as used in this specification and in the appended claims, the singular forms "a," "an," and "the" include plural referents unless the context clearly dictates otherwise. Thus, for example, reference to "a ridge" includes one or more of such features, reference to "a battery" includes reference to one or more of such elements, and reference to "molding" includes reference to one or more of such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. "Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context. Additionally, adjacent structures or elements can in some cases be separated by additional structures or elements between the adjacent structures or elements. In other cases, adjacent structures may be "immediately adjacent" without any additional elements between the adjacent structures.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following figures should not be considered limiting.

Flashlights with Overmolded Grips

The present disclosure describes flashlights having overmolded grips, as well as systems and methods for molding the overmolded grips. Previously used designs for flashlight grips may have various drawbacks. For example, some flashlights include a knurled aluminum grip which can decrease the slipperiness of the flashlight body, but may also make the flashlights less comfortable to hold. A rubber grip stretched over the flashlight shaft tends to be more comfortable. However, this type of grip can have issues with becoming loose over time. In some cases, over time, edges of the rubber grip begin to curl away from the flashlight body as the rubber stretches, and the grip begins to loosen. As the rubber grip becomes loose, it may undesirably rotate about the flashlight shaft or even fall off of the shaft. In contrast, the overmolded grips described herein can provide a comfortable grip without a risk of loosening and rotating about the flashlight shaft or falling off.

In one example of the present technology, a flashlight can include a metal flashlight shaft with a grip overmolded on the shaft. More specifically, the metal flashlight shaft can have a recessed portion of the surface of the shaft that extends circumferentially around the shaft. This circumferential grip recess can be the location where the overmolded grip is added to the shaft. The shaft can also include two raised portions of the surface of the shaft, one at each end of the shaft. The grip recess can be bounded by these two raised portions. The entire shaft, including the grip recess and the two raised portions, can be integrally formed as a single piece of material, such as a single piece of machined aluminum. The grip can be overmolded directly into the grip recess. Thus, the grip is not slid onto the grip recess, but is rather formed in place. The grip can cover the surface of the grip recess and be bounded by the two raised portions. Additionally, the grip can be a single piece of molded material that extends around the entire circumference of the flashlight shaft as a single integrally molded piece, without seams or other interruptions in the molded material. The shape of the grip itself can be similar to a sleeve encompassing the flashlight shaft. However, the grip may not be removable from the flashlight shaft because the grip is bounded by the two raised portions of the shaft. Furthermore, the material forming the grip can be insufficiently flexible to pass over the two raised portions without damage to the grip or the flashlight shaft. In other words, the grip can be a material that does not stretch enough to be removed from the shaft by stretching. Therefore, it would not be possible to manufacture the grip separately and then stretch the grip over the shaft. Accordingly, the grip is overmolded directly onto the flashlight shaft, and the grip is bounded by the two raised portions at either end of the shaft so that the grip will not fall off of the shaft. Additionally, it would not be possible to form the grip by wrapping a flat piece of material around the shaft and then affixing two ends of the material together using sewing or gluing or any other type of seam, because the overmolded grip is integrally molded as a single piece that extends uniformly and continuously around the circumference of the shaft.

One example of a flashlight having an overmolded grip as described herein is shown in FIG. 1. The flashlight 100 includes a flashlight shaft 110 with a grip 102 oriented within a circumferential grip recess 120. The circumferential grip recess 120 is bounded by two raised portions 114. In this example, the grip is flush with the raised portions at the edges 115 of the grip 102 that contact the raised portions. Thus, an area of the grip at each end is flush with the raised portions of the shaft. Adjacent to these flush areas are tapering portions that taper down to a portion 122 of the surface of the grip that is lower than the raised portions of the shaft. In some examples, the entire grip can be either flush with the raised portions of the shaft or lower than the raised portions of the shaft. The grip in this example also includes raised ridges 124 extending circumferentially partially around the grip and a raised logo 126 oriented along a longitudinal length of the grip. The flashlight also includes a light element 130 and an end cap 140 attached to opposing ends of the flashlight shaft. The light element and end cap can be attached by screw threads or by some other attachment mechanism. In some examples, the end cap can be removable to access a battery compartment inside the shaft.

As used herein, "higher" and "lower" refer to distance from a central axis of the flashlight shaft. For example, a flashlight shaft may be cylindrical in overall shape. Features that are "higher" can be farther from the central axis of the shaft, while features that are "lower" can be closer to the central axis (e.g. relative difference in an orthogonal radial direction from the axis located at the geometric center of the shaft cross-section). Thus, the raised portions of the shaft that bound the grip recess are higher than the grip recess surface, because the raised portions are farther from the central axis of the shaft.

Although the examples described herein focus on flashlight shafts having an overall cylindrical cross-section, the flashlight shafts can be formed having other cross-sectional shapes as well. For example, a flashlight shaft can have a cross-section that is oval-shaped, a square or rectangle with sharp or rounded corners, a hexagon or another polygon with sharp or rounded corners, a partial circular cross-section such as a semi-circle shaped cross section or a D-shaped cross section, or other cross-sectional shapes. Shafts having any of these cross-sectional shapes may be used and overmolded grips may be added that extend around the circumference or perimeter of the shaft. In most examples the shaft can be elongated, with the length of the shaft being greater than the cross-sectional diameter or width of the shaft. However, this may not always be the case and in some examples the width of the shaft from side to side can be equal to or greater than the length of the shaft from front to back. Regardless, the overmolded grip is a sleeve shape which is formed within a grip recess having raised portions at either end of the grip recess which prevent movement of the overmolded grip.

Figure 2:
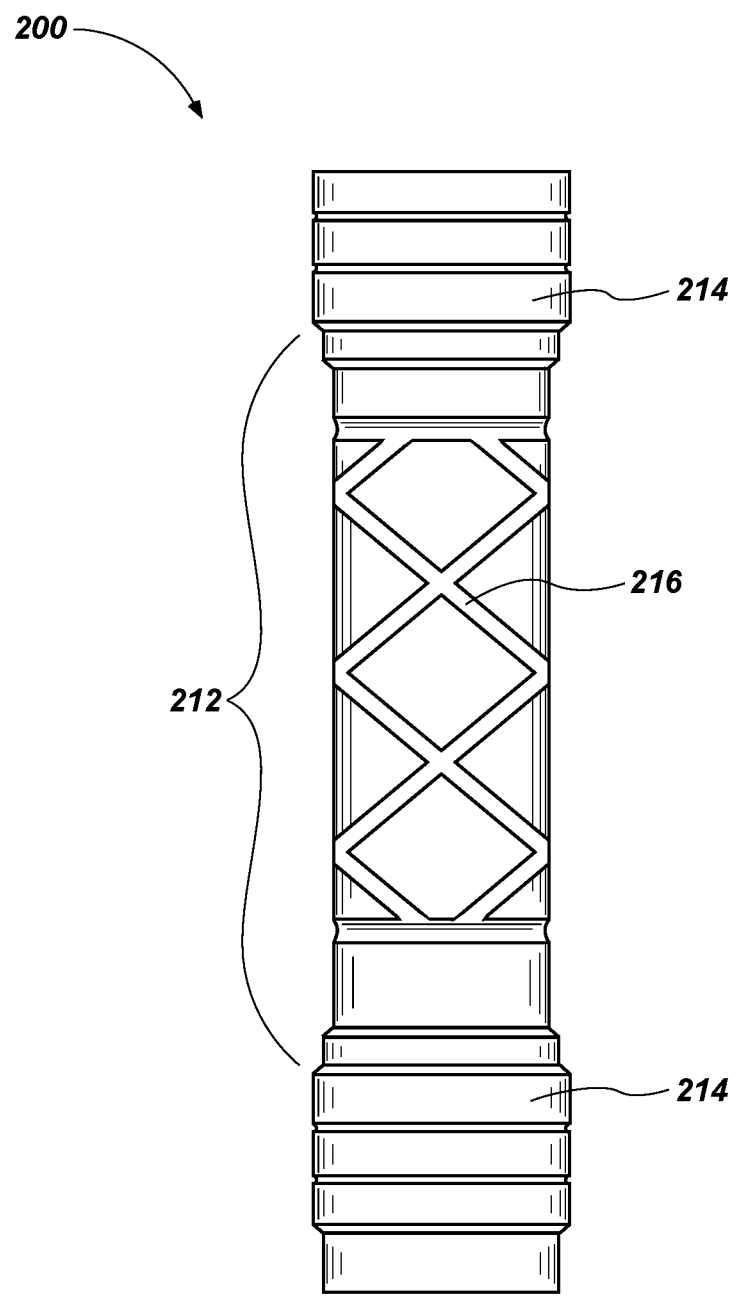
FIG. 2 is a top view of a flashlight shaft in accordance with an example of the present technology.

FIG. 2 shows a flashlight shaft 200 alone, before a grip has been overmolded onto the shaft. The shaft is integrally formed as a single piece (e.g. no segmentable parts). In some examples, the shaft can be formed of molded or machined metal. In one particular example, the shaft can be machined aluminum. A grip recess 212 is bounded by two raised portions 214 at each end of the shaft (e.g. similar to raised portions 114 in FIG. 1). When the overmolded grip is added, the entire surface of the grip recess can be covered by the overmolded grip. In this example, the shaft also includes indented crosshatching 216 in the surface of the grip recess. When the overmolded grip is added, the material making up the grip can flow into the crosshatching and harden, fixing the grip in place on the shaft. Because the grip material occupies the indented crosshatching, the grip does not rotate freely around the shaft. In other examples, other indented or raised features can be present on the surface of the grip recess. The grip can be overmolded onto the surface of the grip recess so that the overmolded grip forms complimentary features that engage with the indented or raised retention features to prevent the grip from rotating about the shaft. These complimentary features are formed on an inner surface of the grip and are formed in situ within corresponding shaft grip retention features. Indented retention features can have a depth and orientation sufficient to prevent the grip from rotating. For example, features can generally include channels which extend non-orthogonally to both a longitudinal axis of the shaft and a circumferential direction (i.e. orthogonal to the longitudinal axis). In some examples, indented features can have a depth from about 0.5 mm to about 5 mm, and most often from about 0.5 mm to about 1.5 mm. Raised grip retention features can also have a height sufficient to prevent the grip from rotating, such as from about 0.5 mm to about 5 mm, and most often from about 0.5 mm to 1.5 mm.

In the example shown in FIG. 2, the raised portions 214 of the flashlight shaft 200 have the appearance of a series of flat rings extending circumferentially around the shaft. Although the raised portions may have the appearance of separate rings, the raised portions and the rest of the shaft are actually a single integrally formed piece. In other examples, the raised portions can have any other appearance as long as the raised portions can bound the grip recess area having a larger radial thickness than the adjacent grip recess. Furthermore, the flashlight shaft 200 can optionally include multiple circumferential grip recesses spaced longitudinally along the shaft.

The dimensions of the flashlight shaft and components thereof can vary depending on the size of the flashlight. For example, the overall diameter of the flashlight shaft can vary from about 1 cm for small pocket flashlights to about 7 cm for larger flashlights. As used herein, the overall diameter of the flashlight shaft can be measured at the largest outer diameter of the flashlight shaft. In further examples, the lowest outer diameter of the shaft in the grip recess area can be from about 7 mm to about 6.5 cm. The depth of the grip recess compared to the raised portions can also vary. In certain examples, the height difference between the raised portions and the lowest point of the grip recess can be from about 0.5 mm to about 1 cm, and most often from about 1 mm to about 5 mm. In some examples, the grip recess can have multiple stepped regions having different depths. For example, the grip recess can have a primary recess depth in a central region and secondary shallower depths at end regions of the grip recess adjacent either raised portion of the shaft. FIG. 2 illustrates one example of such a stepped grip recess. Circumferential edges of the grip recess can be located at either end of the grip recess at an interface with the raised portions. These circumferential edges can have an inner wall which is inclined from a grip recess floor. In some examples, the circumferential edges can be inclined at an angle from about 40° to about 90° with respect to a longitudinal axis of the shaft, and in some cases from about 40° to less than 80°, and in one example 90°.

In further examples, the thickness of the grip can be from about 0.5 mm to about 1 cm, and most often from about 1 mm to about 4 mm. In some cases, the entire grip can be lower than or flush with the raised portions. In another aspect, the outer surface of the overmolded grip can include various design elements such as logos, ridges, and so on. In some cases, the raised design elements can have a height which extends higher than the raised portion of the shaft, as long as end regions of the grip adjacent the raised portion do not exceed the height of the raised portions. In such cases, those end regions can be no less than about 2 mm in width. However, in some examples, any raised design elements can have a height that does not extend higher than the raised portions of the shaft. In other examples, the entire surface of the grip can be lower than the raised portions of the shaft. In alternative examples, the grip can include raised elements in a central portion of the grip such as ridges or logos that are higher than the raised portions of the shaft. In yet another alternative, the grip can be entirely or partially raised above the raised portions of the shaft even at or near ends of the grip. In this case, the rubber grip can have a height which exceeds that of the raised portions although the grip recessed nonetheless creates an anchor to prevent movement of the grip.

Molded ridges and grooves can be incorporated in the grip to reduce the likelihood of the flashlight slipping out of a hand when in use. Various patterns of ridges or grooves can be molded in the surface of the grip. In some examples, the grip can include raised ridges that extend at least partially circumferentially around the grip. In further examples, the grip can include molded grooves extending circumferentially around the grip. In still further examples, the grip can include longitudinal raised ridges or recessed grooves that extend along the longitudinal direction of the shaft. In one example, the grip can include a combination of circumferential raised ridges and longitudinal recessed grooves. In other examples, other patterns such as molded crosshatching, molded finger grips, and the like can be used. In certain examples, molded logos can also be included in the grip. Molded logos can include words and/or pictures and can be oriented in any desired direction on the grip. In one example, a raised logo can be oriented along the longitudinal length of the grip.

Flashlights can also include a light element connected to the flashlight shaft. In some examples, the light element can include its own housing that connects to a front end of the flashlight shaft. In other examples, the light element can fit inside an end of the flashlight shaft such that the integrally formed flashlight shaft itself serves as a housing for the light element. The light element can include a light source such as a light bulb or light emitting diode and corresponding electronic control circuits. In some examples, the light element can also include a switch for turning the light source on and off. In various examples, the switch can be a button, a twist switch, a sliding switch, a flip switch, or any other desired type of switch. In further examples, an on/off switch can be provided elsewhere on the flashlight, such as on an end cap on the back end of the flashlight shaft. In some examples a switch can be located on the shaft itself, such as a button that is accessible through a hole in the shaft. In some examples, the overmolded grip can also include a hole to make the switch accessible, although in some cases a flexible overmolded grip may cover a switch such as a button, and the button may still be operable through the grip itself. Other components that can be included in the light element can include a lens, a reflector, a manually adjustable focusing ring, and the like.

The present technology also extends to methods of systems for manufacturing the flashlights having overmolded grips described herein. In one example, a metal flashlight shaft can be provided such as the shaft 200 shown in FIG. 2. In one example, the shaft can be made by machining a metal tube. In another example, the shaft can be made by molding. Non-limiting examples of suitable metal can include aluminum, steel, titanium, or combinations thereof. Alternatively, the shaft can be formed of a rigid non-metal material such as, but not limited to, polycarbonate, polyethylene, polyurethane, composites thereof, carbon fiber composites, ceramics, and the like.

In certain examples, the metal flashlight shaft can be made of anodized aluminum or titanium. Anodization may be used to provide a corrosion and wear resistant oxide layer on the surface of the flashlight shaft. Anodization can also impart a decorative color to the metal. In some examples, the flashlight shaft can be anodized prior to overmolding the grip onto the shaft.

In a particular example, a method of overmolding a flashlight grip can include providing the metal flashlight shaft which has a circumferential grip recess bounded by two raised portions. The grip recess can have a surface that is lower than the two raised portions around the circumference of the shaft. In other words, every part of the surface of the grip recess can be lower than the raised portions. The shaft can be integrally formed as a single piece. The shaft can be positioned in a mold to isolate a grip volume bounded by the surface of the grip recess, the raised portions, and an interior grip surface of the mold. A polymer material can be injected into the isolated volume to form an overmolded grip covering the surface of the grip recess and bounded by the two raised portions. Once cured, the polymer material can be insufficiently flexible to pass over the two raised portions without damage. In this way, the overmolded grip can be fixed in place and is not susceptible to become loose and falling off the shaft.

Figure 3:
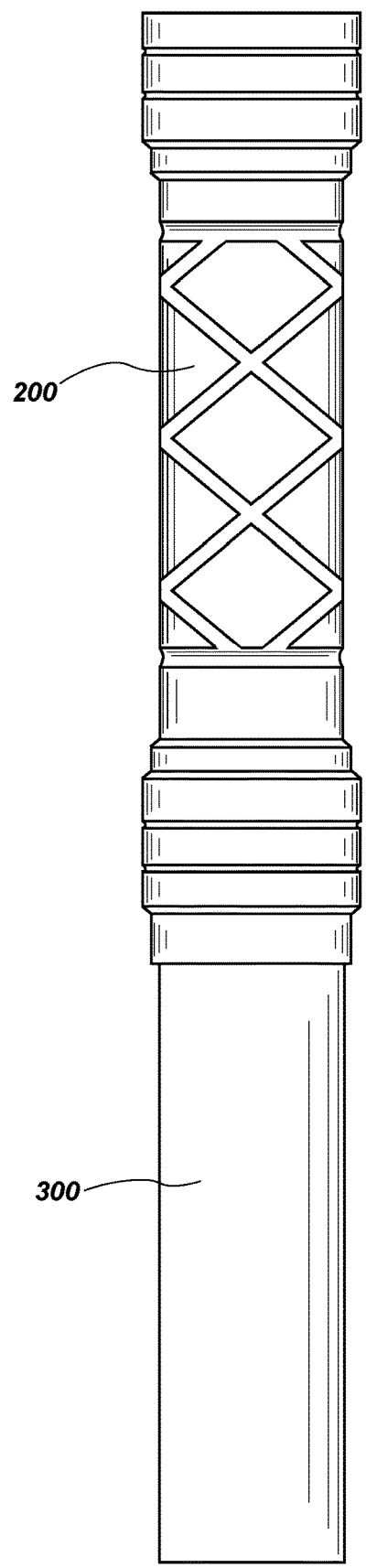
FIG. 3 is a top view of a flashlight shaft and a support bar partially inserted into the flashlight shaft in accordance with an example of the present technology.

In a further example, a support bar can be placed inside the metal flashlight shaft. FIG. 3 shows a support bar 300 sliding into the shaft 200. The support bar can provide structural support to the hollow metal shaft during molding. This can prevent the shaft from collapsing or deforming under the high pressure applied when the grip is molded onto the shaft. In some examples, the support bar can have a diameter that is slightly smaller than the inner diameter of the shaft. In one example, the support bar can have a tight tolerance with the shaft so that the diameter of the support bar is from 0.01 mm to 0.1 mm less than the inner diameter of the shaft. The support bar can typically be formed of a metal or suitable rigid material such as ceramic, carbon fiber, or the like.

Figure 4:
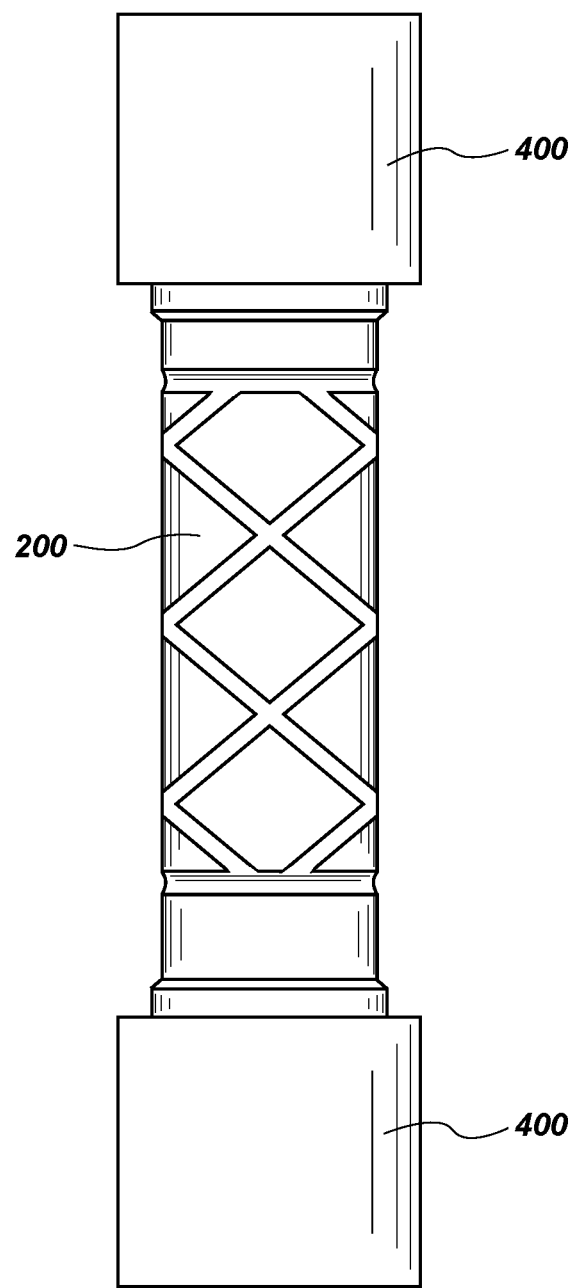
FIG. 4 is a top view of a flashlight shaft with locking rings placed over each end in accordance with an example of the present technology.

FIG. 4 shows the shaft 200 with locking caps 400 placed over the raised portions of the shaft, optionally with the support bar oriented within the shaft. These locking caps or rings can be any suitable shape which fluidly isolates the grip mold volume. In some examples, such locking caps can slide over the raised portions of the shaft to help reduce flashing of excess grip material at the edges of the grip. The locking caps can have an interior diameter that is very close to the diameter of the raised portions of the shaft. For examples, the interior diameter of the locking rings can be from 0.01 mm to 0.1 mm greater than the outer diameter of the raised portions of the shaft. Having a tight tolerance between the locking rings and the raised portions can reduce or eliminate flashing at an interface with the grip recess when the grip material is injected in the mold during the molding process.

The shaft having the support bar inside the shaft and the locking caps slid over the ends of the shaft can then be placed in a mold assembly to mold the grip onto the shaft. In some examples, the mold assembly can include a two-piece mold made up of a mold bottom and a mold top. The mold bottom and mold top can be shaped to accept the shaft with the locking rings and to leave a mold cavity around the grip recess of the shaft when the two mold pieces are aligned with one another, so that the grip can be formed by injecting material into the cavity.

Figure 5:
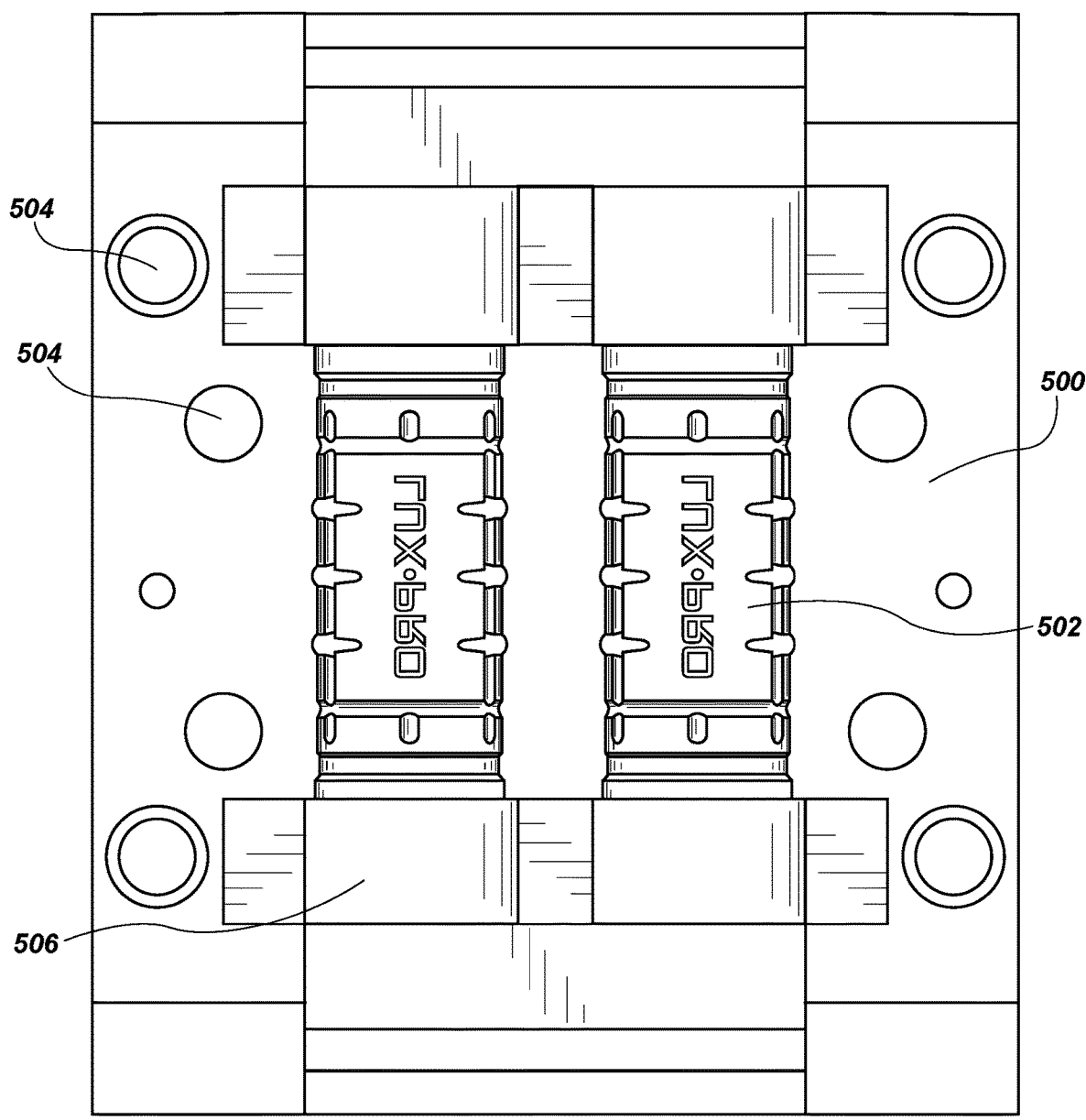
FIG. 5 is a top view of a mold bottom piece for molding a flashlight grip in accordance with an example of the present technology.

FIG. 5 shows a mold bottom 500 designed to hold two flashlight shafts simultaneously. The mold bottom includes an interior grip surface 502 which is an inverse pattern that forms the desired surface of the overmolded grip. The interior grip surface of the mold can include any features desired to be molded into the grip surface, such as logos, ridges, grooves, and so on. The locking rings can fit into locking cap recesses 506 in the mold bottom. The mold bottom can also include alignment holes 504. The alignment holes can line up with alignment rods on the mold top to ensure that the two halves of the mold are correctly aligned during molding. However, other mold alignment systems can be used.

Although the example shown in the figures involves a mold for making two overmolded grips at a time, molds can be designed to make any other number of grips. For example, a mold can be designed to accept a single flashlight shaft and make a single overmolded grip. Alternatively, a mold can be designed to accept three or more flashlight shafts and make overmolded grips on each flashlight shaft. Additionally, the molds shown in the figures use alignment holes and rods to align the mold halves, but any other type of registration marks can also be used to align the mold halves. Furthermore, molds used to make the overmolded grips described do not necessarily include two mold halves, but molds can be single-part molds or multi-part molds.

Figure 6:
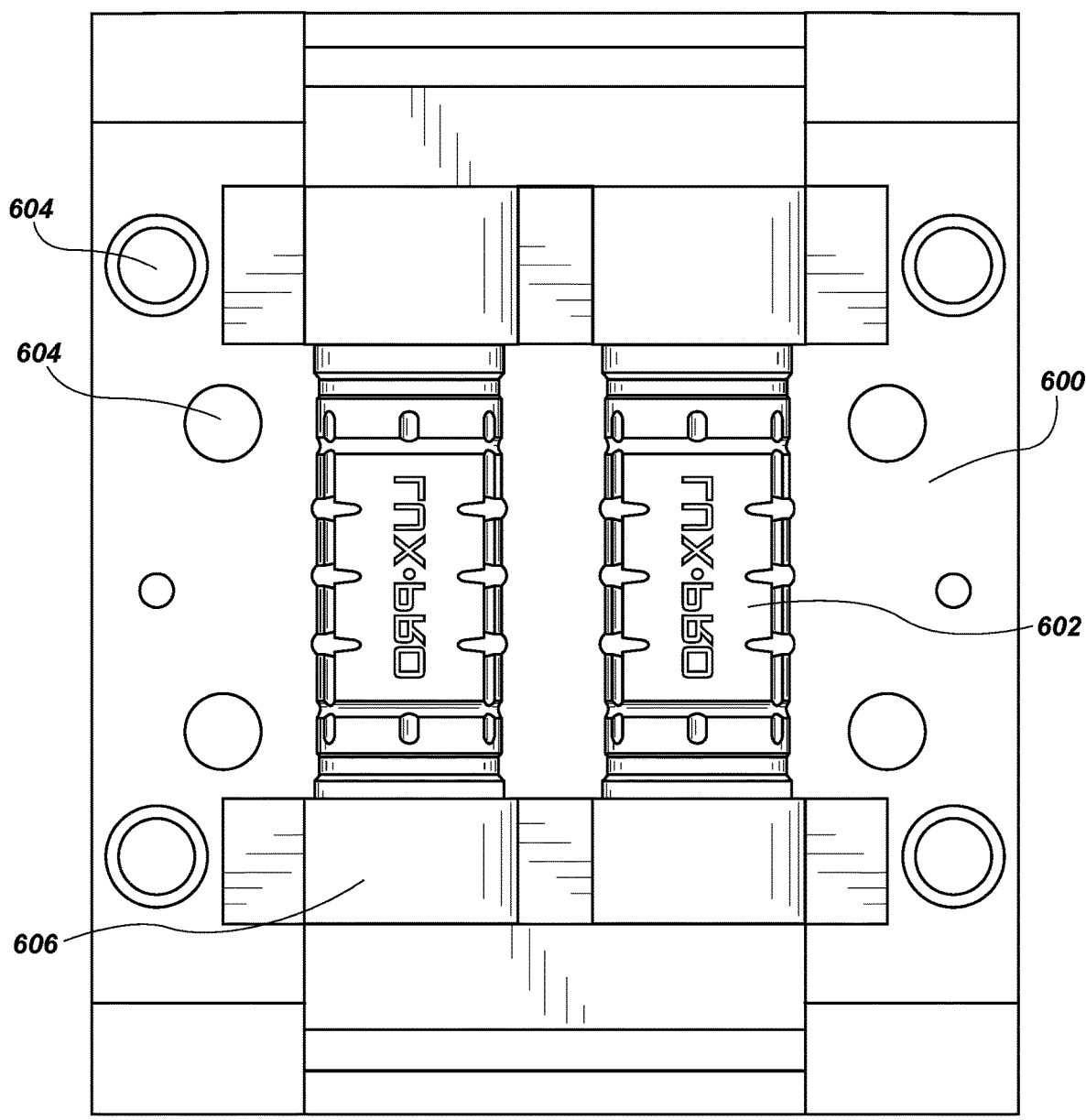
FIG. 6 is a bottom view of a mold top piece for molding a flashlight grip in accordance with an example of the present technology.

FIG. 6 shows a mold top 600 that can fit together with the mold bottom shown in FIG. 5. The mold top also includes an interior grip surface 602 and locking ring recesses 606. Alignment rods 604 are located to slide into the alignment holes on the mold bottom.

Figure 7:
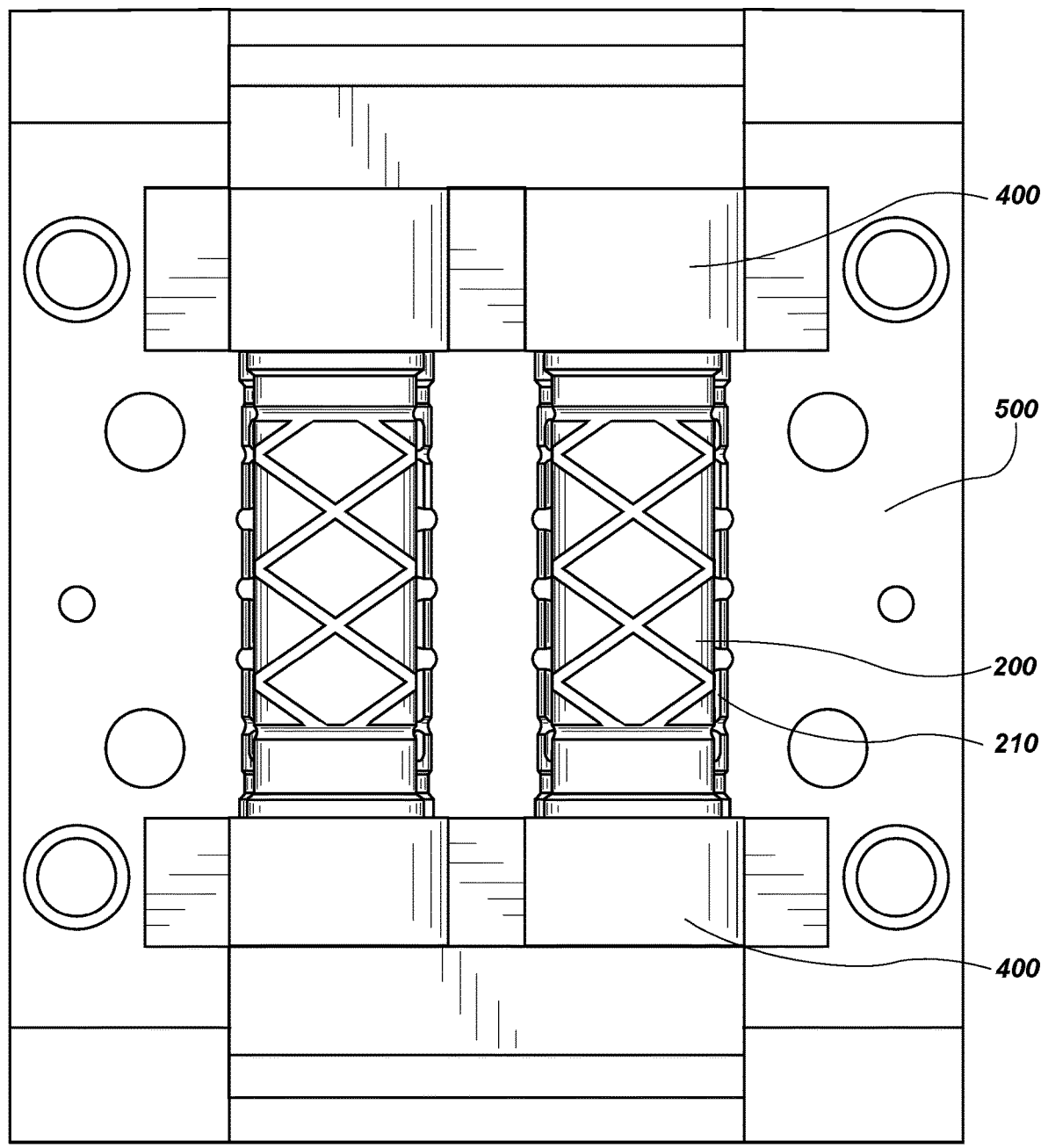
FIG. 7 is a top view of a mold bottom piece with bare flashlight shafts in place for molding as a complimentary mold with the mold top piece in accordance with an example of the present technology.

FIG. 7 shows the mold bottom 500 with two flashlight shafts 200 placed in the mold bottom recesses. The locking caps 400 on each end of the flashlight shafts fit into the locking ring recesses of the mold bottom. As shown in the figure, there is a small volume 210 between the surface of the grip recesses of the flashlight shafts and the interior grip surfaces of the mold bottom. This volume will be filled with the polymeric material during molding to form the overmolded grip.

The mold top and mold bottom can be pressed together with two flashlight shafts inside. Alternatively, the molds can be formed having any number of flashlight recesses (e.g. one, two, three, etc) depending on the desired production volume. Material can then be injected into the mold cavities through material inlets (not shown). The material inlets can be located anywhere convenient to allow material into the mold cavities. For example, a polymer material injection port can be connected to the mold. The polymer material injection port can be connected to a polymer material injector to inject a polymer material into the mold.

In some examples, the overmolded grip can be formed from a polymer material. In certain examples, the polymer material can be thermoplastic or thermosetting. Non-limiting examples of the polymer material can include thermoplastic rubber, thermoplastic polyurethane, polypropylene, polyethylene, styrene-butadiene block copolymer, polyethylene terephthalate, polyamide, polytetrafluoroethylene, polyvinyl chloride, and others. In certain examples, the material can be insufficiently flexible to pass over the raised portions of the flashlight shaft without breaking or tearing the material. This can prevent the overmolded grip from stretching and coming off the flashlight shaft. In certain examples, the polymer material can have a modulus of elasticity of at least 0.1 GPa, most often greater than 2 GPa, and in some cases greater than about 5 GPa.

The injection of polymeric material into the mold can be performed at atmospheric pressure or at an elevated pressure. The temperature of the polymeric material being injected can in some cases depend on the melting temperature of the particular material being used.

Figure 8:
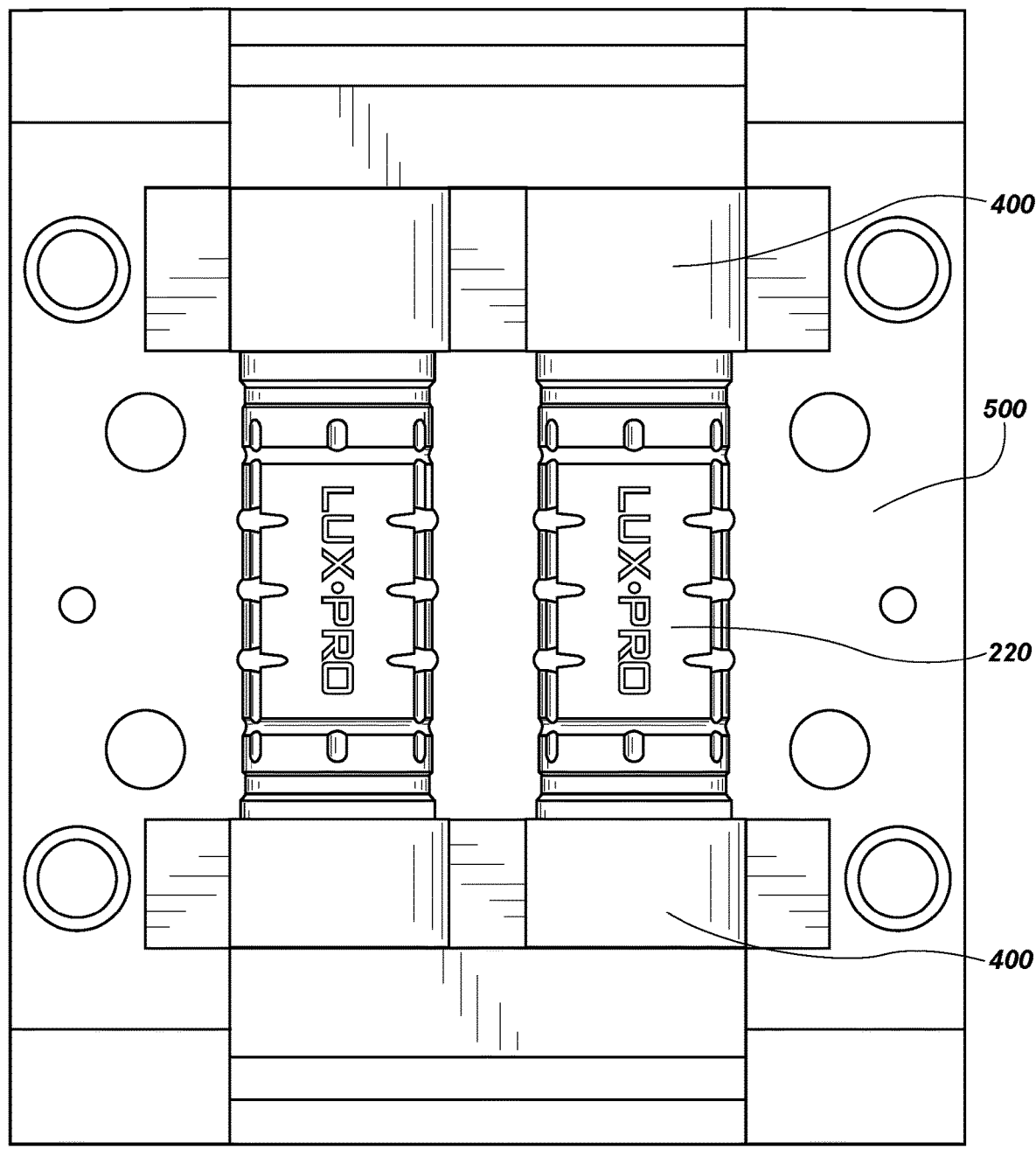
FIG. 8 is a top view of a mold bottom piece with flashlight shafts having overmolded grips after molding in accordance with an example of the present technology.

After the overmolded grip has been formed and cured, the flashlight shaft can be removed from the mold. FIG. 8 shows the mold bottom 500 with the two flashlight shafts after the overmolded grips 220 have been formed on the shafts. The overmolded grips cover the grip recesses on the shafts, which extend to the locking rings 400 on either end of the shafts.

Figure 9:
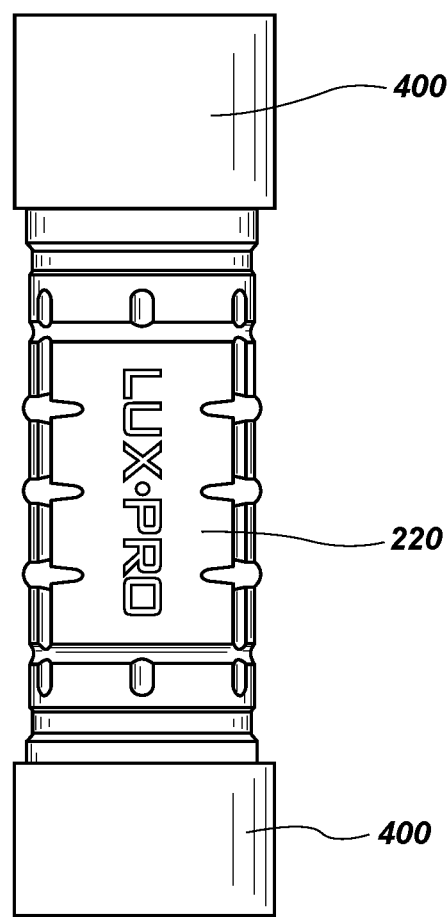
FIG. 9 is a side view of a flashlight shaft having an overmolded grip, with locking rings placed over either end, in accordance with an example of the present technology.

FIG. 9 shows a flashlight shaft with the overmolded grip 220 and two locking rings 400 after being removed from the mold. The locking rings can be slid off the ends of the shaft and the support bar can be removed from inside the shaft. The shaft with the finished overmolded grip can then be assembled with the other flashlight components to make a complete flashlight. In one example, a light element can be attached to a front end of the flashlight shaft and an end cap can be attached to a back end of the flashlight shaft. In further examples, certain components may be placed inside the flashlight shaft such as battery terminals.

In further examples of the present technology, overmolding systems can include any of the components and features described above. In one example, an overmolding system can include a mold adapted to be engaged with a metal flashlight shaft. The mold can isolate a grip volume when the mold is engaged with the metal flashlight shaft. The metal flashlight shaft can have a hollow interior and a circumferential grip recess bounded by two raised portions on the exterior. The grip recess can have a surface lower than the raised portions around the circumference of the shaft. The grip volume can be bounded by the surface of the grip recess, the raised areas, and an interior grip surface of the mold. The system can also include a support bar sized to slide into the hollow interior of the shaft to provide support to the shaft during molding. The system can also include a polymer material injection port connected to the mold. The polymer material injection port can be operably connectable to a polymer material injector to inject a polymer material into the isolated volume.

In another example, the mold can include locking rings sized to fit over the two raised areas of the metal flashlight shaft. In yet another example, the mold can include a mold top and a mold bottom. The mold top and bottom can engage with the locking rings. The interior surface of the mold which bounds the isolated volume can be the interior surfaces of the mold top and the mold bottom. These surfaces can also be referred to as the interior grip surfaces of the mold top and mold bottom.

Example

A flashlight having the design shown in FIG. 1 was manufactured by first machining a flashlight shaft from a solid aluminum block. The shaft was anodized to form a black colored exposed surface. The shaft had crosshatching in the grip recess and raised portions at either end of the grip recess as shown in FIG. 2. An overmolding system was then used to form an overmolded grip on the flashlight shaft. The overmolding system included a support bar that was a solid steel bar sized to fit into the interior of the shaft. The diameter of the steel bar was less than 0.2 mm less than the interior diameter of the shaft. After inserting the support bar, locking rings were placed on the ends of the shaft. The locking rings were also made of steel and included circular recess sized to accept the ends of the shaft. The tolerance between the outer diameter of the ends of the shaft and the circular depressions of the locking rings was sufficient to prevent flashing. The assembly of the shaft with the locking rings attached was then placed in a steel mold bottom as shown in FIG. 7. A steel mold top was placed against the mold bottom to isolate the grip volume. The molds were injected with polymer. The material was allowed to cool to form an overmolded grip on the flashlight shaft.

After molding, the assembly of the shaft with the locking rings and support bar was removed from the mold halves. The locking rings and support bar were removed to yield a shaft having an overmolded grip. A lighting element was then attached to the front end of the shaft. The lighting element included an LED in a housing with an on/off button. An end cap was screwed onto the back end of the shaft to make a completed flashlight.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A flashlight, comprising:
    a flashlight shaft having a circumferential grip recess bounded by two raised portions, wherein the grip recess has a surface lower than the two raised portions around a circumference of the shaft, the shaft being integrally formed as a single piece;
    a grip overmolded into the grip recess, such that the grip covers the surface of the grip recess and is bounded by the two raised portions, the grip being formed of a material insufficiently flexible to pass over the two raised portions without damage; and
    a light element connected to the flashlight shaft.

2. The flashlight of claim 1, wherein the grip is formed of thermoplastic rubber.

3. The flashlight of claim 1, wherein a height of an outer surface of the grip is flush with a height of an outer surface of the two raised portions at edges of the grip contacting the two raised portions.

4. The flashlight of claim 3, wherein the grip comprises tapering portions adjacent to areas of the grip at the edges that are flush with the two raised portions, such that a portion of a surface of the grip between the tapering portions is lower than the raised portions.

5. The flashlight of claim 1, wherein the grip comprises molded raised ridges extending circumferentially at least partially around the grip.

6. The flashlight of claim 1, wherein the grip comprises a raised logo oriented along a longitudinal length of the grip.

7. The flashlight of claim 1, wherein the surface of the grip recess comprises an indented or raised feature in the surface of the grip recess to prevent rotation of the grip about the flashlight shaft and an underside of the grip has complimentary features which engage with the indented or raised feature.

8. The flashlight of claim 7, wherein the indented or raised feature is indented crosshatching.

9. The flashlight of claim 1, wherein the two raised portions are shaped as raised flat rings extending circumferentially around the flashlight shaft.

10. The flashlight of claim 1, wherein the flashlight shaft is rigid and formed of a metal.

11. A method of overmolding a flashlight grip, comprising:
    providing a flashlight shaft having a circumferential grip recess bounded by two raised portions, wherein the grip recess has a surface lower than the two raised portions around the circumference of the shaft, the shaft being integrally formed as a single piece;
    positioning the flashlight shaft in a mold to isolate a grip volume bounded by the surface of the grip recess, the raised portions, and an interior grip surface of the mold; and injecting a polymer material into the isolated volume to form an overmolded grip covering the surface of the grip recess and bounded by the two raised portions, the polymer material being a material insufficiently flexible to pass over the two raised portions without damage.

12. The method of claim 11, wherein providing the flashlight shaft comprises molding or machining the flashlight shaft in aluminum.

13. The method of claim 11, wherein the flashlight shaft is rigid and formed of one or more of a metal, rigid polymer, ceramic, carbon fiber, and composites thereof.

14. The method of claim 11, wherein the flashlight shaft comprises a hollow interior and wherein the method further comprises inserting a support bar into the hollow interior prior to injecting the thermoplastic material to provide structural support to the flashlight shaft during molding.

15. The method of claim 14, wherein the support bar conforms to the interior of the flashlight shaft with a tolerance of 0.01 mm to 0.1 mm.

16. The method of claim 14, wherein the hollow interior of the flashlight shaft is substantially cylindrical in shape.

17. The method of claim 11, wherein the mold comprises:
locking rings sized to fit over the two raised areas of the flashlight shaft;
a mold top; and
a mold bottom, wherein the mold top and mold bottom engage with the locking rings and the interior surface of the mold bounding the isolated volume is the interior surfaces of the mold top and mold bottom, wherein positioning the flashlight shaft in the mold comprises sliding the locking rings over the two raised areas and placing the flashlight shaft and locking rings between the mold top and mold bottom.

18. The method of claim 11, wherein the polymer material is injected at a temperature from 30° C. to 150° C. and a pressure from 10 kpsi to 50 kpsi.

19. An overmolding system, comprising:
a mold adapted to be engaged with a flashlight shaft and isolating a grip volume, the flashlight shaft comprising a hollow interior and having a circumferential grip recess bounded by two raised portions, wherein the grip recess has a surface lower than the raised portions around the circumference of the shaft and the grip volume is bounded by the surface of the grip recess, the raised areas, and an interior grip surface of the mold;
a support bar sized to slide into the hollow interior to provide structural support to the flashlight shaft during molding; and
a polymer material injection port connected to the mold which is operably connectable to a polymer material injector to inject a polymer material into the isolated volume.

20. The overmolding system of claim 19, wherein the mold comprises:
locking rings sized to fit over the two raised areas of the flashlight shaft;
a mold top; and
a mold bottom, wherein the mold top and mold bottom engage with the locking rings and the interior surface of the mold bounding the isolated volume is the interior surfaces of the mold top and mold bottom.

21. The flashlight of claim 1, wherein the grip that is overmolded into the grip recess comprises a cylindrical shape.

\* \* \* \* \*